Oct. 27, 1964    F. C. RIFFELMACHER ETAL    3,154,352
SCRAPING TOOL
Filed July 5, 1963

INVENTORS.
Fred C. Riffelmacher
Ray Poirier

Learman Learman & McCulloch
ATTORNEYS

United States Patent Office 3,154,352
Patented Oct. 27, 1964

3,154,352
SCRAPING TOOL
Fred C. Riffelmacher, 4923 Two Mile Road, Bay City, Mich., and Ray Poirier, 1265 Orchard Road, Essexville, Mich.
Filed July 5, 1963, Ser. No. 293,058
2 Claims. (Cl. 306—40)

This invention relates to improvements in scrapers that are adapted for scraping and smoothing aluminum and soft metal doors, strips, and other articles of all kinds.

One of the prime objects of the invention is to provide a scraper which when the surfaces adjacent the slot are the same curvature as the scraping edge of the blade, the surface can be readily scraped by a workman using scraping strokes which scrape the surfaces of the material adjacent the slot.

Another object of the invention is to provide a scraper tool having a broad bearing surface arranged to rest on the work in such manner as to hold the blade in correct scraping position and prevent the blade from gouging, scoring, or cutting into the surface of the work being procesesd.

A further object is to design a very simple, practical, and economical scraping tool provided with quickly adjustable guide means for guiding the blade over the work and to serve as a scraper for scraping the joints in brickwork to remove mortar or the like with a minimum amount of effort.

Still a further object is to design a simple tool composed of few parts, all of substantial construction, which is readily adjustable to suit the work, and which can be readily disassembled for storage in a tool case when desired.

A further object still is to design a rugged, practical and economical scraper provided with a relatively wide blade, the scraping edge of which can be either curved, flat, or of any other desired shape with shoulder curvatures where necessary to fit projections in the work.

With the above and other objects in view, the present invention consists in the combination and arrangement of parts, hereinafter more fully described, illustrated in the accompanying drawing, and more particularly pointed out in the appended claims; it being understood that changes may be made in the form, size, proportion and minor details of construction, without departing from the spirit, or sacrificing any of the advantages of the invention.

Figure 2:
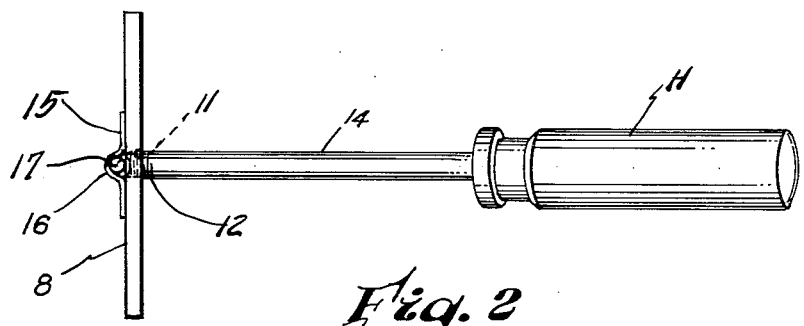
FIG. 2 is a top plan view thereof.
Figure 1:
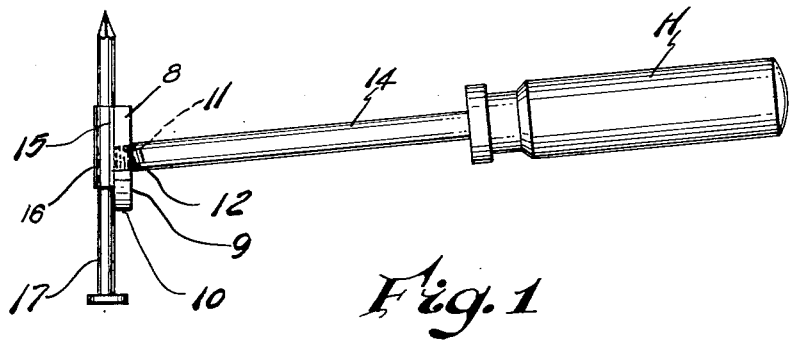
FIG. 1 is a side elevational view of our new scraping tool.
Figure 3:
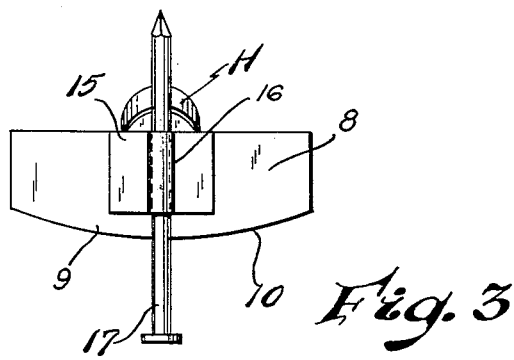
FIG. 3 is a front elevational view.

Referring now more specifically to the drawing in which we have shown the preferred embodiment of our invention.

The numeral 8 indicates a typical blade, the lower edge 9 of which is curved as shown, and this lower edge is sharpened as at 10 and shaped to fit the surface of the work W to be scraped.

A centrally disposed, tapered, threaded opening 11 is provided in the blade 8, it is disposed at an angle to a horizontal line and accommodates the threaded end 12 of the handle shank 14, and a handle H is mounted on said shank, said shank and handle being disposed at a slight upward angle with relation to the work and provides hand clearance when the tool is in use.

A guide holder 15, comprising a relatively thin sheet of metal, is provided on the front face of the blade as shown and can be welded or otherwise secured thereto; said holder being centrally looped as at 16 to accommodate a vertical guide 17 which can be a common nail, or any other shape guide can be utilized as desired, it being merely necessary to generally shape the loop to suit the shape used, and it must, of course, be vertically adjustable in said loop.

This guide 17 can also serve as a mortar scraper if desired, the lower edge of the blade riding on the adjacent brick or blocks, and the guide extending a predetermined distance into the mortar joint to remove the mortar accordingly.

The loop 16 is in direct horizontal alignment with the threaded opening 11 provided in the blade, and when the guide 17 is placed in desired position and the handle turned to screw the shank end thereinto, the extreme end of the threaded section 12 will engage the guide and clamp it securely against the wall of the loop 16, holding it firmly in adjusted position. To vertically adjust or remove the guide, it is merely necessary to rotate the handle to loosen the clamping of the guide which can then be raised, lowered, or removed, as required. The tool can be compactly bundled for storage or shipment as it is merely necessary to unscrew the handle from the blade which also releases the guide, and the handle, blade and guide can then be compactly bundled and arranged for storage or shipment.

A common nail is adaptable for use as a guide, or any other shape guide can be utilized, depending on the nature of the work to be done. The handle H is common to a number of tools presently on the market, the blade 8 being the only special part of the tool that requires machine labor, and the handle serves a dual purpose of securing both the blade and guide or guide tool in set position.

Figure 4:
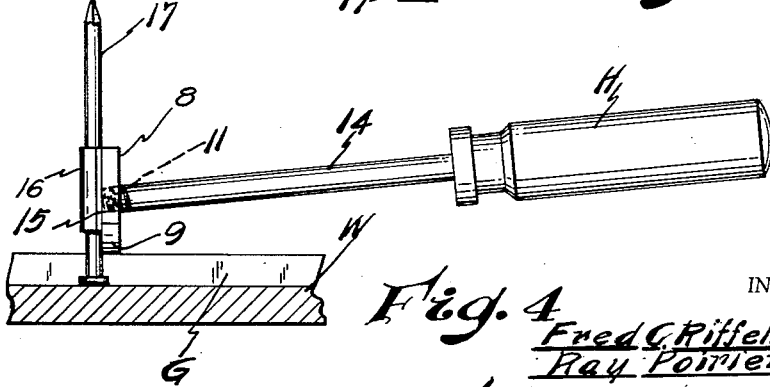
FIG. 4 is a perspective view showing the tool in engagement with the work.

In practice, the lower end of guide nail 17 is inserted in a groove G provided in the work W (see FIG. 4 of the drawing), and the workman, by means of the handle H, reciprocates the tool to provide scraping strokes for smoothing and finishing the area covered by the blade.

What we claim is:

1. A tool of the character described comprising; a blade member having inner and outer faces formed with a centrally disposed, threaded opening through said faces; a loop strap secured on the outer face of said blade and a guide member adjustably disposed in said loop between the face of the blade and the loop in the strap, the axis of said loop being transverse to and substantially normal to the axis of the threaded opening so as to intersect the axis of the threaded opening, and a handle member provided with a threaded shank, threadedly mounted in and extending through the blade opening and adjustably clamping the guide in position against said loop.

2. The combination defined in claim 1 in which the threading of the handle into the blade opening serves to secure the blade on the handle and also clamps the guide in the loop.

References Cited in the file of this patent
UNITED STATES PATENTS

| | | |
|---|---|---|
| 972,757 | Duffy | Oct. 11, 1910 |
| 1,192,763 | Donnelly | July 25, 1916 |
| 1,489,331 | Mull | Apr. 8, 1924 |